No. 654,271. Patented July 24, 1900.
G. A. McKEIL.
OIL CUP.
(Application filed Feb. 1, 1899.)
(No Model.)
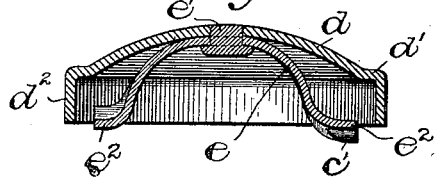
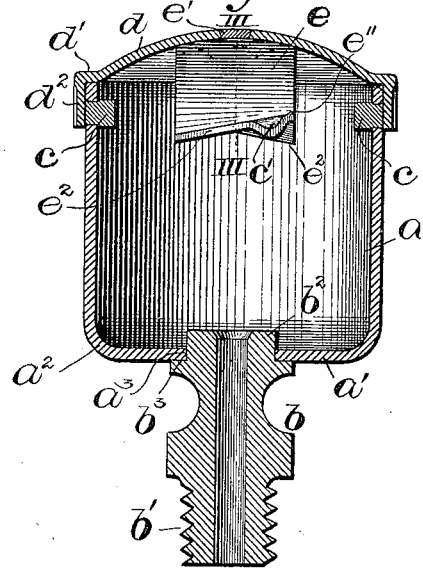
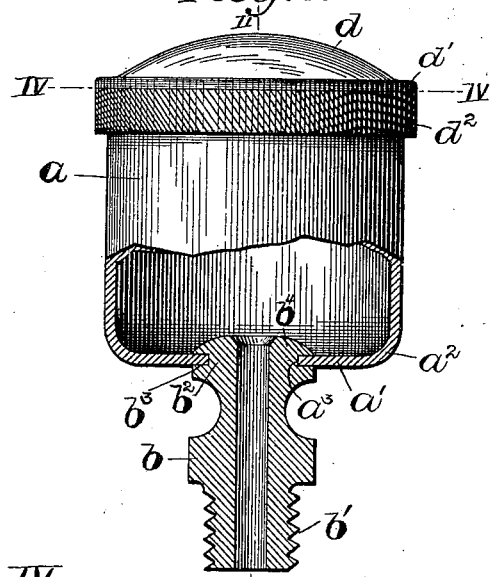
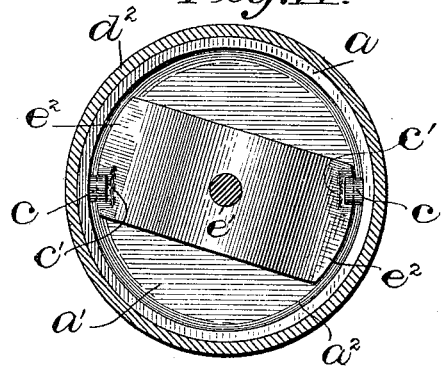
Witnesses
O. W. Smith
Osgood H. Dowell
Inventor
George A. McKeil
By Julius C. Dowell
His Attorney

UNITED STATES PATENT OFFICE.

GEORGE A. McKEIL, OF JACKSON, MICHIGAN, ASSIGNOR OF ONE-HALF TO THE WITHINGTON & COOLEY MANUFACTURING COMPANY, OF SAME PLACE.

OIL-CUP.

SPECIFICATION forming part of Letters Patent No. 654,271, dated July 24, 1900.

Application filed February 1, 1899. Serial No. 704,149. (No model.)

*To all whom it may concern:*

Be it known that I, GEORGE A. MCKEIL, a citizen of the United States, residing at Jackson, in the county of Jackson and State of Michigan, have invented certain new and useful Improvements in Oil-Cups; and I do hereby declare the following to be a full, clear, and exact description of the invention, such as will enable others skilled in the art to which it appertains to make and use the same.

This invention relates to oil-cups or lubricators; and it consists, substantially, in such features of improvement as will hereinafter be more particularly described.

The invention has reference more particularly to oil-cups or lubricators such as are employed in a stationary manner upon machinery of various kinds, the position of the same being usually upright, or substantially so, by which to permit the oil or other lubricant to flow by gravity to the part or parts to be lubricated. It has been common heretofore to employ various kinds of oil-cups in a similar way; but in many instances such cups did not prevent entirely the leakage of oil from the cup due either to the loosening of the cap or cover or of the connection between the said cup and its supporting-stem. The connection between the cup and its stem has in the majority of cases been effected by some form of screw-thread fastening, and even though flanges and washers have been employed on either one or both sides of the connection, still there would be leakage due to the loosening of the fastening or connection produced by the vibrations of the machinery upon which the cup was mounted. In other instances valves have been employed; but such a construction is complicated and expensive.

One object of the present invention is to obviate the inconvenience or disadvantages pointed out and to provide an oil-cup or lubricator which is absolutely non-leakable and one which can be mounted in position with equal facility as heretofore.

A further object is to strengthen the connection between the cup and the upper part of the supporting-stem therefor, by which to prevent loosening of such connection from vibratory causes.

A still further object is to provide improved means for attaching the cap or cover to the cup which possess advantages of convenience in manipulation and increased effectiveness in establishing and maintaining a complete closure and, moreover, make the throwing off of the cover impossible when it has once been adjusted to its proper closing position.

In the accompanying drawings, which are to be taken as a part of this specification and in which similar letters of reference are used to denote corresponding parts in the different views, Figure I represents an oil-cup of my improved construction, the upper portion of which appears in side elevation and the lower portion in central vertical section. Fig. II represents a section taken on the line II II of Fig. I, the cap being shown in position to be lifted off the oil-cup or at right angles to its locked position and the stem appearing as when first applied and yet disconnected from the body of the cup, or, in other words, before its upper end is upset, as shown in Fig. I. Fig. III shows the cap or cover in cross-section at right angles to Fig. II on the line III III in the latter figure. Fig. IV shows a horizontal section taken on the line IV IV of Fig. I.

The body portion of the oil-cup consists, preferably, of a thin shell of drawn steel comprising a cylindrical portion $a$, composing the sides of the cup, and a bottom or head $a'$, curving into said cylindrical portion, as shown at $a^2$, the whole structure above indicated being integral and the said bottom or head being formed with a central circular aperture, as shown at $a^3$. A hollow stem $b$, having a screw-threaded lower end $b'$ for application to the machine element, is formed at its upper end with a reduced cylindrical portion $b^2$, turned to closely fit the aperture $a^3$ in the bottom of the body portion, the stem being provided with an annular shoulder $b^3$ at the base of the reduced portion $b^2$ to abut the outer side of the bottom $a'$, and the said reduced portion being of sufficient length to extend somewhat into the interior of the shell, as clearly shown in Fig. II. This inwardly-protruding portion of the stem is upset or clenched down upon the inner side of the bottom $a'$, as shown at $b^4$ in Fig. I, and thereby the shoulder $b^3$ and the outer side of the bottom of the shell are forced into intimate contact, while the portion of the stem within the shell is converted into a rounded head in intimate contact with the inner side of the bottom of the shell. In this way it will be seen that the stem and shell are rigidly connected together, while a joint is effected which will not be affected by vibration and will always prevent leakage. It will be understood that the character of the body portion of the cup is such as to require a different form of connection between it and the stem than the usual screw-threads and that the rivet form of connection above described is well adapted to the purpose and at the same time has advantages over the screw-thread form of connection aside from its adaptability to the peculiar form of body portion.

Studs or pins c are fastened, preferably by riveting, in the sides of the shell at opposite points, said studs or pins projecting toward each other within the shell for a short distance and round in cross-section.

The cap or cover comprises a concavo-convex portion $d$, merging into a flat annular portion $d'$, designed to bear upon the upper edge of the cylindrical portion $a$ of the drawn-steel shell, and a milled annular flange or skirt $d^2$, depending from said portion $d'$ and adapted to take over the outer side of said cylindrical portion of the shell. A flat steel spring $e$ in the form of a bow is centrally secured to the concavo-convex portion $d$ of the cap or cover, preferably by means of a rivet $e'$, and said spring is formed at its ends with flanges $e^2$, each having a transverse obliquity with respect to the body of the spring, said flanges being oppositely inclined. The lower end of each of said flanges occupies such a position that when the cap is fitted upon the cup such lower end may pass under either of the pins $c$; but the inclination of the flange is such that upon turning the cap the flange will press against the pin and the spring will be put under tension thereby. Each flange is formed near its higher end with a socket, depression, or indentation $c'$, adapted to accommodate one of the pins. It will be seen that the spring being put under tension by the turning of the cap, with the flanges of said spring riding under the pins, when the cap has been turned far enough to bring the indentations $c'$ under the pins the indented portions of the flanges will snap around the latter, and thus the cap will be locked in position against turning in either direction accidentally. The cap is turned to the right when it is to be locked, and a reasonable amount of pressure exerted in the opposite direction will disengage the indentations from the pins and allow the cap to be freed entirely from the latter, so as to be readily removable. The tension of the spring may be such as to prevent further movement of the cap to the right after the indentations $c'$ have arrived under the pins, or further movement may be prevented by the abruptness of the walls of the indentations, or the ends of the flanges may be turned up, as shown at $e''$, to positively prevent turning of the cap beyond the proper position for locking it.

It will be seen that a construction such as above described and illustrated in the accompanying drawings is well calculated to fulfil the objects primarily stated. However, it is to be remarked that the invention herein described is susceptible of embodiment in other forms.

Having thus fully described my invention, what I claim as new, and desire to secure by Letters Patent of the United States, is—

In an oil-cup, the combination of the body having inwardly-projecting pins or studs on opposite side walls, a detachable cap or cover, and a bowed spring centrally secured to the cover and having end portions with upper surfaces oppositely inclined transversely of the spring for engagement with the under sides of said studs, respectively, the oppositely-inclined end portions having sockets or indentations at their higher portions for the studs to engage, substantially as described.

In testimony whereof I affix my signature in presence of two witnesses.

GEO. A. McKEIL.

Witnesses:
   F. W. CAMERON,
   E. M. CONVERSE.